United States Patent
Seely et al.

(10) Patent No.: US 10,536,385 B2
(45) Date of Patent: Jan. 14, 2020

(54) OUTPUT RATES FOR VIRTUAL OUTPUT QUESES

(71) Applicant: Hewlett Packard Enterprise Development LP, Houston, TX (US)

(72) Inventors: Jonathan Michael Seely, Roseville, CA (US); Mark Shillingburg, Roseville, CA (US); Eric Pelletier, San Francisco, CA (US); Brian Peter L'Ecuyer, Elk Grove, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 64 days.

(21) Appl. No.: 15/487,925

(22) Filed: Apr. 14, 2017

(65) Prior Publication Data

US 2018/0302329 A1 Oct. 18, 2018

(51) Int. Cl.
*H04L 12/825* (2013.01)
*H04L 12/935* (2013.01)
*H04L 12/835* (2013.01)
*H04L 12/26* (2006.01)

(52) U.S. Cl.
CPC .......... *H04L 47/26* (2013.01); *H04L 49/3027* (2013.01); *H04L 49/3045* (2013.01); *H04L 43/16* (2013.01); *H04L 47/30* (2013.01)

(58) Field of Classification Search
None
See application file for complete search history.

(56) References Cited

U.S. PATENT DOCUMENTS

| | | | |
|---|---|---|---|
| 6,856,595 B1 | 2/2005 | Brown | |
| 7,760,647 B2* | 7/2010 | Li | H04L 47/10 370/236 |
| 7,860,004 B2* | 12/2010 | Spatscheck | H04L 47/10 370/231 |
| 8,144,588 B1* | 3/2012 | Ma | H04L 49/90 370/235 |
| 8,228,797 B1* | 7/2012 | Utley | H04L 47/10 370/235 |
| 9,077,466 B2 | 7/2015 | Thomas et al. | |
| 9,088,497 B1 | 7/2015 | Zimerman | |
| 9,755,932 B1* | 9/2017 | Godbole | H04L 43/0858 |
| 10,027,590 B2* | 7/2018 | Sinha | H04L 47/18 |
| 2005/0108444 A1* | 5/2005 | Flauaus | H04L 41/0853 710/15 |
| 2005/0276219 A1* | 12/2005 | Wang | H04L 12/14 370/229 |

(Continued)

OTHER PUBLICATIONS

Hari Balakrishnan et al., "Rate Guarantees and Overload Protection in Input-Queued Switches," Mar. 2004, pp. 1-11, Sandhurst Corporation, <nms.csail.mit.edu/paper/hsa.pdf>.

*Primary Examiner* — Donald L Mills
(74) *Attorney, Agent, or Firm* — Park, Vaughan, Fleming & Dowler LLP

(57) ABSTRACT

Examples include sampling a transmit rate of an egress port queue on a destination node, determining a utilization percentage of the egress port queue based on the transmit rate and a total rate capacity of the egress port, and determining a backlog percentage of the egress port queue. Examples also include determining an output rate for a virtual output queue on a source node based on the utilization percentage and the backlog percentage. The virtual output queue is for the egress port queue.

20 Claims, 6 Drawing Sheets

(56) References Cited

U.S. PATENT DOCUMENTS

| | | | |
|---|---|---|---|
| 2008/0304503 A1* | 12/2008 | Blake | H04L 47/10 |
| | | | 370/412 |
| 2010/0232446 A1* | 9/2010 | Ma | H04L 47/215 |
| | | | 370/412 |
| 2014/0105218 A1* | 4/2014 | Anand | H04L 47/6255 |
| | | | 370/412 |
| 2014/0161135 A1* | 6/2014 | Acharya | H04L 47/263 |
| | | | 370/412 |
| 2017/0005951 A1* | 1/2017 | Labonte | H04L 49/3045 |

* cited by examiner

OUTPUT RATES FOR VIRTUAL OUTPUT QUEUES

BACKGROUND

A computer network may include a variety of computing devices that are connected to each other by communication channels. The connection of the computing devices allows data generated at one computing device to be processed and transferred to other computing devices in the network. In some examples, a computer network may include a switching architecture with at least one source node connected to at least one destination node by a fabric node. The switching architecture may help move data in the network from one location to another location.

BRIEF DESCRIPTION OF THE DRAWINGS

The following detailed description references the drawings, wherein.

DETAILED DESCRIPTION

Figure 1A:
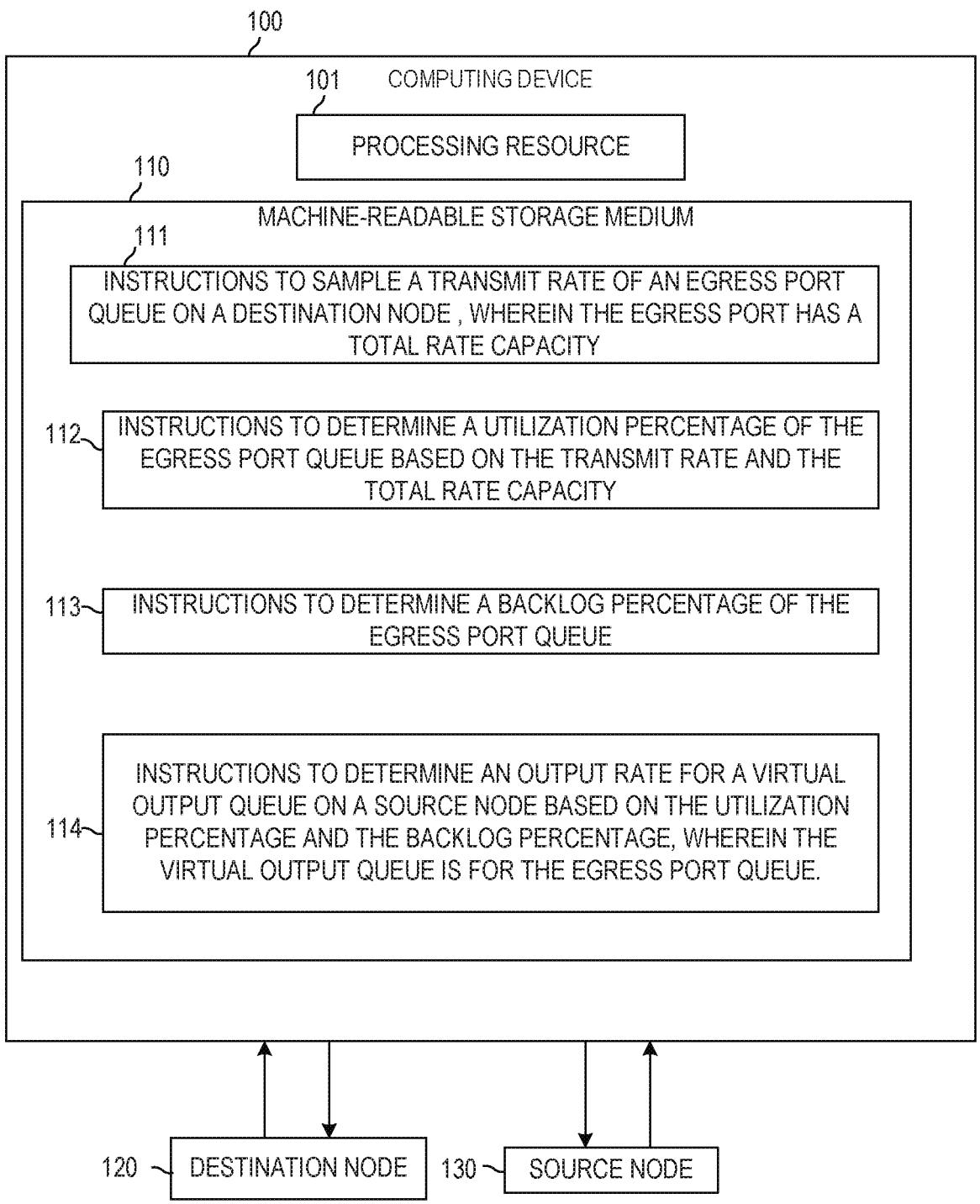
FIG. 1A is a block diagram of a computing device to determine an output rate for a virtual output queue, according to some examples.

In some examples, a source node may comprise a virtual output queue (VoQ). Using VoQs, the source node may create individual queues for data that is to be sent to the same egress port queue instead of having one cumulative, general queue. The output rate of data from a VoQ affects the congestion of the egress port queue to which the VoQ is linked. Despite this affect, in some examples, the VoQ is unaware of the congestion of the egress port queue to which it is linked and must estimate the egress port queue's congestion state. Accordingly, the VoQ may send an amount of traffic into the fabric that may overload the egress port buffers and/or the fabric node in an effort to keep the egress buffers occupied and allow for appropriate QoS scheduling on the egress port. This overload may result in dropped data packets in-fabric and post-fabric.

In some examples, a switching architecture may use the amount of data in the egress port queue (i.e., the egress port queue depth) to regulate the speed at which an associated VoQ sends data into the fabric. This involves maintaining a certain amount of data in the buffer of each queue in the egress port at all times. However, the regulation of VoQ output traffic based solely on the depth of an egress port queue may result in different latencies on different egress port queues because each egress port queue may transmit data at different rates. Additionally, determining congestion state of an egress port queue based solely on the egress port queue depth may not provide an accurate depiction of the state of the egress port queue. Accordingly, regulation based on this method is not adaptive to sudden changes in available space in shared resources and oscillating service patterns that may be experienced by the network.

Examples disclosed herein address these technological difficulties by allowing the VoQ output rate (i.e., the rate at which traffic is sent from the VoQ into the fabric) to be changed based on the transmit rate of an egress port queue and the depth of the egress port queue. Additionally, examples disclosed herein allow for a control of the latency of an egress port queue and for the modification of that latency based on the depth of the egress port queue and available space on shared resources. Accordingly, examples described herein allow for a dynamic control loop of the VoQ output rate that ties together the output rate with a more complete depiction of the state of the egress port queue, including the egress port queue transmit rate, the available shared resources, and the egress port queue depth. This leads to a reduction in the amount of data that is stored in the buffer of the egress port queues and a decrease in dropped packets in fabric and post-fabric in the event of sudden changes in the network.

In some examples, a computing device is provided with a non-transitory machine-readable storage medium. The non-transitory machine-readable storage medium includes instructions, that, when executed, cause a processing resource to sample a transmit rate of an egress port queue on a destination node. The destination node egress port has a total rate capacity. The storage medium also include instructions, that, when executed, cause the processing resource to determine a utilization percentage of the egress port queue based on the transmit rate and the total rate capacity, determine a backlog percentage of the egress port queue, and determine an output rate for a virtual output queue on a source node based on the utilization percentage and the backlog percentage. The virtual output queue is for the egress port queue.

In some examples, a network comprises a destination node. The destination node includes an egress port with an egress port queue, a buffer memory, a monitor engine, a usage engine, and a rate engine. The egress port has a total rate capacity. The buffer memory is to hold an amount of data for the egress port queue, the monitor engine is to sample a transmit rate of the egress port queue, the usage engine is to determine a utilization percentage of the egress port queue based on the transmit rate and the total rate capacity, and the rate engine is to determine an output rate for a virtual output queue associated with the egress port queue based on the utilization percentage.

In some examples, a method is provided comprising sampling a transmit rate of an egress port queue on a destination node, sampling an amount of data in the egress port queue, determining a backlog percentage of the egress port queue based on the amount of data, determining a utilization percentage of the egress port queue based on the transmit rate and a total rate capacity of the egress port, and sending the output rate to the source node through a fabric node.

Referring now to the figures, FIG. 1A is a block diagram of a computing device 100 to determine an output rate for a virtual output queue. As used herein, a "computing device" may be a server, computer networking device, chip set, desktop computer, workstation, or any other processing device or equipment. In some examples, computing device 100 may be a server that interfaces with a remote network hardware, such as a source node switch.

Computing device 100 includes a processing resource 101 and a storage medium 110. Storage medium 110 may be in the form of non-transitory machine-readable storage medium, such as suitable electronic, magnetic, optical, or other physical storage apparatus to contain or store information such as instructions 111, 112, 113, 114, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a nonvolatile memory where a copy of software or other data is stored.

In the example of FIG. 1, instructions 111, 112, 113, and 114 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to destination node 300A of FIG. 3. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, and 114 as described herein.

Instructions 111 may be executable by processing resource 101 such that computing device 100 is operative to sample a transmit rate of an egress port queue on a destination node 120. The destination node 120 may be a computing device that is part of a network. The network may include a communication pathway between a first computing device and second computing device, at least one data linkage (e.g., electrical cable such as Ethernet, optical fibers, radio waves, etc.) or a combination thereof to allow the communication and exchange of data between the first and second computing device. A network may also include intermediary computing devices between the first computing device and the second computing device. In some examples, the network may be an individual network or a collection of many such individual networks interconnected with each other and functioning as a single large network (e.g., an intranet). In some examples, the network may be implemented as a local area network (LAN), wide area network (WAN), etc. In some examples where the network is implemented as a LAN, destination node 120 may be an "edge" node of the network. An edge node may be a computing device that provides entry or exit points into or out of the LAN, etc. For example, destination node 120 may provide an egress point out of the LAN. Computing device 100 may be connected to destination node 120 and source node 130 via the same network.

Destination node 120 may have at least one egress port (not shown in FIG. 1.) The at least one egress port may have a total rate capacity. As used herein, a total rate capacity is the maximum speed at which the egress port may transmit data from the destination node 120 onto another location (e.g., 10 Gigabits per second (Gbps), 25 Gbps, 50 Gbps, etc.) The egress port may also have different priorities of data that are transmitted from destination node 120 at different rates. For example, the egress port on destination node 120 may have one priority, two priorities, three priorities, four priorities, etc. The transmit rates of the different priorities may add up to equal the total rate capacity of the egress port. Each priority used by egress port may have its own separate queue. Thus, an egress port with four priorities may have four different queues, one queue for each priority. Accordingly, instructions 111 allow computing device 100 to sample the transmit rate of at least one egress port queue on an egress port of destination node 120. In some examples, this sampling may be done via polling of the transmit rate (e.g., polling in 1 microsecond intervals, etc.) In other examples, the sampling may be done via computing device 100 receiving a signal each time the transmit rate of the at least one egress port queue changes. In some examples, the egress port may have some priorities that are not active (i.e., not in use). In these examples, the egress port queues that are not active are not sampled.

Instructions 112 may be executable by processing resource 101 such that computing device 100 is operative to determine a utilization percentage of the egress port queue that is sampled by computing device 100. As used herein, a utilization percentage of an egress port queue represents how much of the total rate capacity the egress port queue is using at the time of sampling. Thus, in some examples, the utilization percentage of an egress port queue may be determined based, at least partially on, the transmit rate of the egress port queue and the total rate capacity of the egress port. For example, an egress port queue for priority (0) on an egress port may be transmitted from destination node 120 at 2 Gbps. The total rate capacity of the egress port may be 25 Gbps. Accordingly, the utilization percentage of priority (0) queue may be determined by dividing 2 Gbps by 25 Gbps (8%).

Instructions 113 may be executable by processing resource 101 such that computing device 100 is operative to determine a backlog percentage of the egress port queue. As discussed above, each egress port queue is associated with a priority. In some examples, a user of destination node 120 may initially set a latency threshold for the priority associated with each egress port queue. As used herein, a latency threshold includes a time that a data packet spends in the egress port queue waiting to be transmitted. In other words, it is the amount of time measured from when the data is placed in the egress port queue to when the data is leaves the egress port queue. For example, an egress port queue associated with priority (0) may have an initially-set latency threshold of 1 microsecond. This means that a data packet should not spend more than 1 microsecond in the egress port queue. As used herein, a backlog percentage describes how much actual latency there is on the egress port queue as compared to the latency threshold. A 50% backlog percentage translates to a 500 nanosecond of actual latency as compared to a latency threshold of 1 microsecond. Accordingly, the backlog percentage may describe whether the buffer for the egress port queue is being used adequately.

Accordingly, instructions 113 may also include instructions that are executable by processing resource 101 such that computing device 100 samples an amount of data that is in the egress port queue (the "depth" of the egress port queue). This may be accomplished via interval polling of the egress port queue. Based on the sampled "depth" of the egress port queue, the transmit rate of the egress port queue, and the initially-set latency threshold, a backlog percentage of the egress port queue may be determined. This is because, based on the transmit rate of the egress port queue and the initially-set latency threshold, a latency threshold depth may be determined. The latency threshold depth is the amount of data that the egress port queue should in the queue have to meet the initially-set latency threshold.

For example, a port with a latency threshold of 1 microsecond and a total capacity rate of 25 Gbps would have a latency threshold depth of 3125 Bytes (125 Bytes multiplied by 25 Gbps). In situations where the egress port has four active priorities, for each priority to have the same latency threshold as the port, the latency threshold depth of the port is proportionally allocated to each priority according to the transmit rate of each priority. Thus, priority 1 may have an egress port queue that is being transmitted at 2 Gbps. For the priority 1 egress port queue to have a latency threshold of 1 microsecond, the latency threshold depth of priority 1 egress port queue should be 250 Bytes (determined by 2 Gbps multiplied by 3125 Bytes divided by 25 Gbps). By comparing the latency threshold depth (250 Bytes) to the sampled depth of priority 1 egress port queue, a backlog percentage for the egress port queue for priority 1 may be determined. For example, in situations where the sampled depth is 125 Bytes, the backlog percentage of priority 1 egress port queue is 50% (determined by dividing 125 Bytes by 250 Bytes). In other words, when there is 125 Bytes on the egress port queue for priority 1 and priority 1 is transmitting at a rate of 2 Gbps, the backlog time is 500 nanoseconds, instead of 1 microsecond.

Instructions 114 may be executable by processing resource 101 such that computing device 100 is operative to determine an output rate for a virtual output queue on a source node 130. Source node 130 may be a computing device that is part of the network that destination node 120 and computing device 100 are connected to. The virtual output queue on source node 130 for which an output rate is determined is specifically for the egress port queue that is sampled on destination node 120. As used herein, an output rate for a virtual output queue describes a service rate at which the data in the queue is sent from source node 130 into the network to travel to destination node (i.e. into the fabric of the network). In some examples, the output rate is based, at least partially on, the utilization percentage and the backlog percentage.

In some examples, the output rate may first be based on the utilization percentage. The utilization percentage may then be adjusted by a modifier that is associated to the backlog percentage. In some examples, a lookup table may associate specific backlog percentages to a specific modifier. In some examples, the modifier may be a percent adjustment. For example, the utilization percentage may be 16% and the backlog percentage may be 25%. Using the lookup table, a backlog percentage of 25% is associated to a percent adjustment modifier of 50%. Accordingly, the utilization percentage 16% is adjusted by 50%, which is 8%. The 8% is then added to the utilization percentage (16%) to determine the output rate (24%=8%+16%). Accordingly, the output rate for the virtual output queue would be 24% of the total rate capacity of the egress port.

Figure 1B:
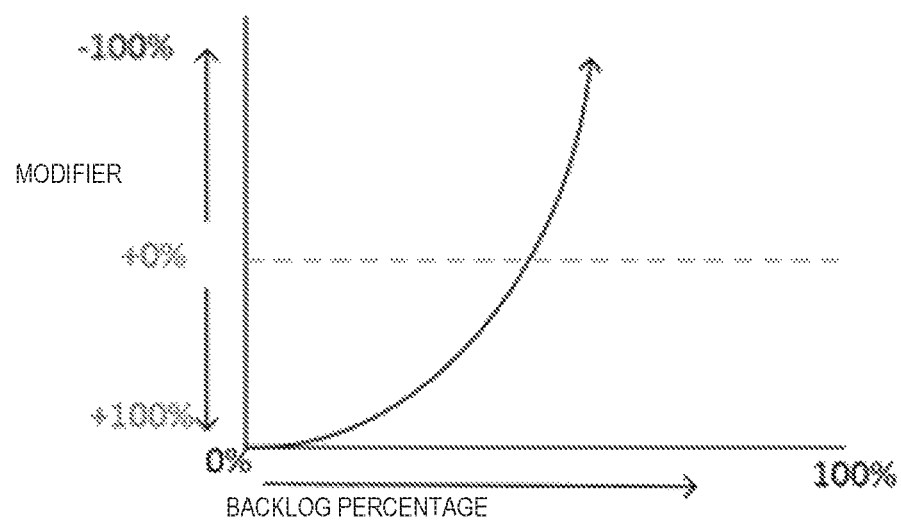
FIG. 1B illustrates the relationship between the backlog percentage and a modifier, according to some examples.

FIG. 1B illustrates a non-limiting example of the relationship between the backlog percentage and the modifier. As can be seen in FIG. 1B, the modifier may be a negative adjustment or positive adjustment. For positive adjustments, the modifier is added to the utilization percentage. For negative adjustments, the modifier is subtracted from the utilization percentage. Thus, in the example discussed above, where the utilization percentage is 16%, if the backlog percentage is associated to a −50% adjustment modifier, then 8% is subtracted from the utilization percentage to determine the output rate (16−8=8%). The relationship between the backlog percentage and the modifier may vary according to characteristics that are specific to the network in which the destination node is in. Some characteristics include the number of virtual output queues on the source node, the speed of the fabric nodes in the network, the network size, etc. Thus, while FIG. 1B illustrates the relationship between the backlog percentage and the modifier as an exponential relationship, other relationships may also be used, including linear relationships, etc.

In some examples, instructions 113 may include instructions to modify the initially-set latency threshold of the egress port queue. This allows for the network to dynamically adapt to situations where the egress port queue is sharing a pooled memory resource and there is a decrease in availability of the pooled memory resource. For example, in some situations, the destination node 130 may include shared resources, such as a shared buffer memory that is allocated amongst the different egress port priorities (and thus egress port queues). Instead of allowing shared resources to be depleted on a first-come-first-serve basis, the resources may be allocated based on prioritization of traffic importance.

As discussed above, an initially-set latency threshold for an egress port queue may set a latency threshold depth of the egress port queue. This latency threshold depth indicates the amount of space from the shared memory resources that the egress port queue desires. However, in some situations, there may not be enough available space to allocate to egress port queue. Accordingly, instructions 113 may modify the initially-set threshold of the egress port queue based on the available space in the shared resources, the latency threshold depth of the egress port queue, the sample of the depth of the egress port queue, and an additional amount of space desired by the egress port queue. The additional amount of space desired by the egress port queue may be determined by taking the latency threshold depth and subtracting the sample of the depth of the egress port queue. The additional amount of space desired by the egress port queue may then be compared to the available space in the shared resources. In response to a determination that the available space in the shared resources is more than the additional desired amount, the initially-set latency threshold is kept the same and is unchanged. This is because there is sufficient pooled resources to service the egress port queue in order to keep the initially-set latency threshold.

In response to a determination that the available space in the shared resources is equal to or less than the additional desired amount, the additional space given to the egress port queue may be limited by the following equation:

$$X = Y \times \frac{Y \times C}{Z} \qquad (\text{EQ. 1})$$

where X is the additional space that may be given to egress port queue,

Y is the available space in the shared resources

C is the biasing factor for the specific egress port queue, and

Z is the additional space desired by the egress port queue.

In some examples, the biasing factor may be a percentage (e.g., 100%–0%). In some examples, the percentage may be represented by a decimal (1, 0.95, 0.9, 0.8, etc.) The biasing factor for each egress port queue may be different from each other. For example, a queue that handles high priority traffic may have a higher biasing factor than a queue that handles low priority traffic. A higher biasing factor allows more shared resources to be used to handle the high priority traffic when shared resources are becoming depleted as compared to a lower biasing factor. Thus, in some examples, the biasing factor is based on the destination node's quality of service (QoS) policies (i.e., traffic prioritization).

Accordingly, the determined additional space that may be given to the egress port queue (X) is used along with the sampled depth to determine a new latency threshold. For example, an egress port queue may currently be using 150 B of the available shared resource. As determined by Eq. 1, an additional 100 B of available shared resources may be allocated to the egress port queue. Thus, 250 B may be used to determine a new latency threshold for the egress port queue. For an egress port queue that is transmitting at 4 Gbps, the new latency threshold is 500 nanoseconds. In examples where the initially-set latency threshold is replaced by a new latency threshold, the new latency threshold may be used to determine backlog utilization, modifier, and output rate, as discussed above.

In some examples, machine-readable storage medium 110 may include instructions to transmit the output rate to source node 130. Using the output rate, source node 130 may adjust the speed at which it sends packets from a virtual output queue.

Figure 2A:
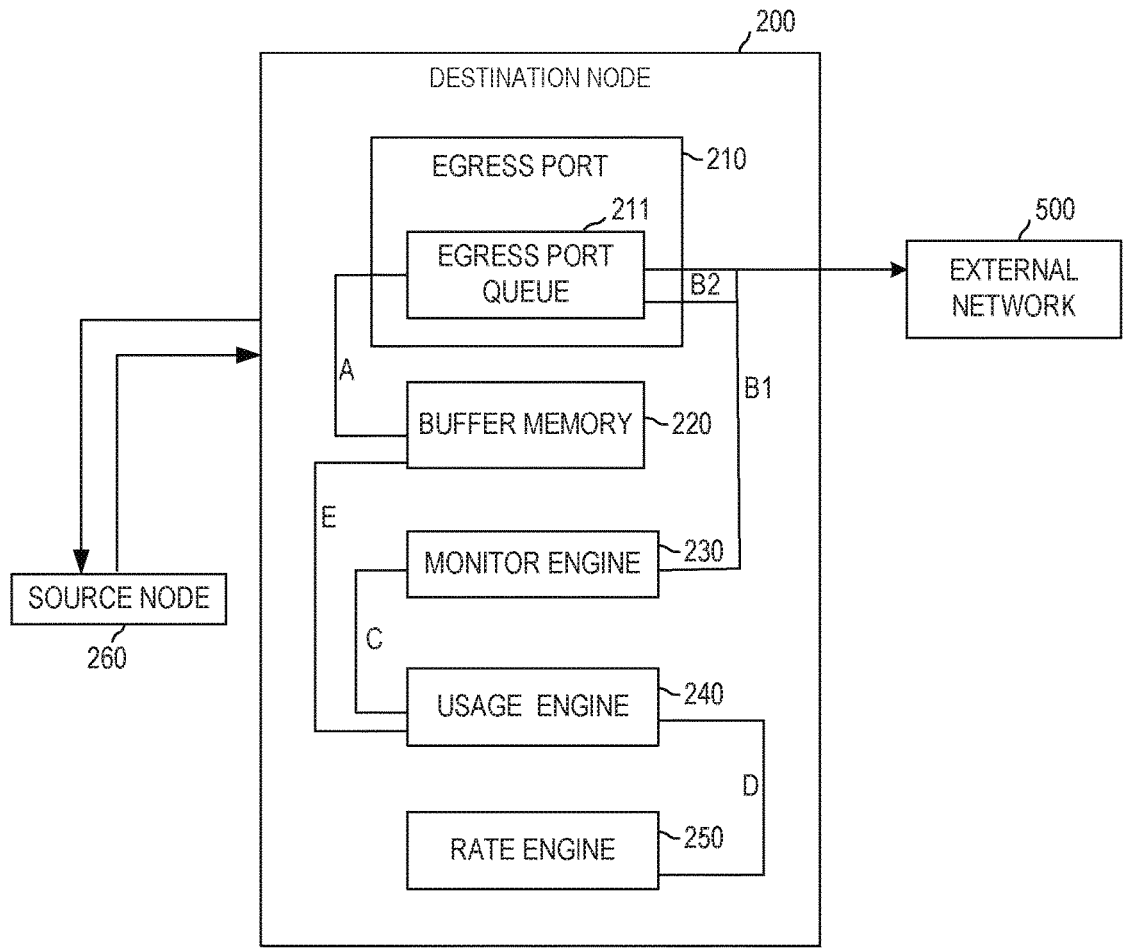
FIG. 2A is a block diagram of a destination node with an egress port queue and a rate engine to determine an output rate for a virtual output queue on a source node, according to some examples.
Figure 3:
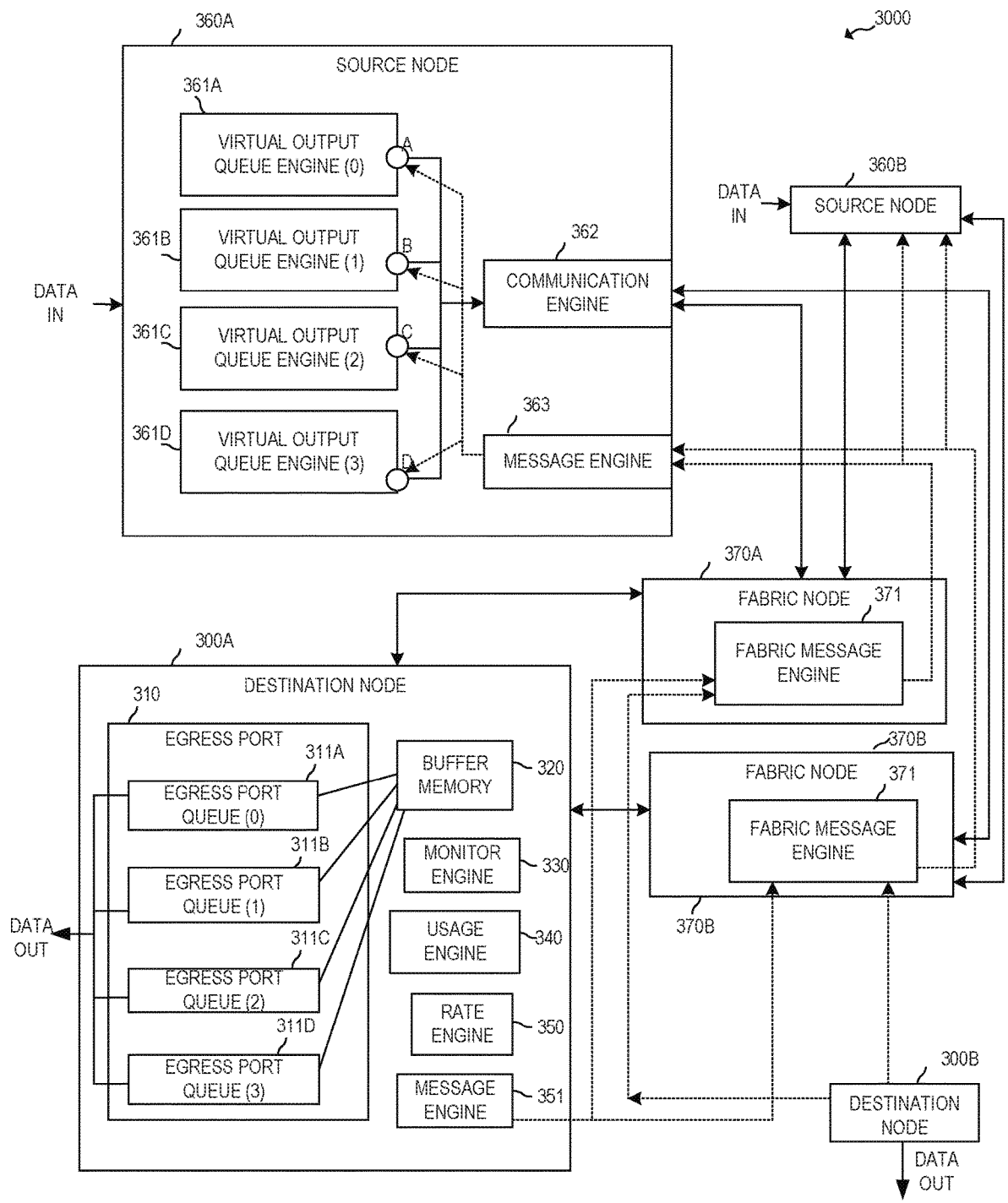
FIG. 3 is a block diagram of a network including a source node, a fabric node, and a destination node, according to some examples.

Computing device 100 of FIG. 1A, which is described in terms of processors and machine-readable storage mediums, can include at least one of the structural or functional aspects of computing device 200 of FIG. 2A or source node 360A of FIG. 3, which are described in terms of functional engines containing hardware and software.

FIG. 2A is a block diagram of a destination node 200 with an egress port queue and a rate engine to determine an output rate for a virtual output queue associated with the egress port queue. Destination node 200 is a computing device. In some examples, destination node is a computer networking device (e.g., a switch) that interfaces with source node 260 and an external network 500 (e.g., the Internet). Accordingly, in some examples, destination node 200 may receive data packets from source node 260 and transmit them to external network 500. Destination node 200 includes egress port 210 with an egress port queue 211 and a buffer memory 220.

Egress port 210 of destination node 200 allows a physical connection between destination node 200 to external network 500 (e.g. via an Ethernet cable). In some examples, egress port 210 may have at least one priority that is active on egress port 210 (including one priority, two priorities, three priorities, etc.). Egress port queue 211 is a queue for the at least one priority on egress port 210. Accordingly, egress port queue 211 may order the data that is for the at least one priority, keeping track of what data should be transmitted next to external network 500. In examples where there are at least two active priorities, each active priority may have a separate egress port queue and each egress port queue may be transmitted at different rates. Egress port 210 may have a total rate capacity, as discussed above. The transmit rates of all the egress port queues on egress port 210 may add up to equal the total rate capacity of egress port 210.

Buffer memory 220 may comprise a storage medium of destination node 200 that is a temporary holding place for data that is received by egress port 210 but cannot yet be transmitted from the destination node 200. Accordingly, buffer memory 220 may temporarily hold that data for egress port queue 211. This is represented by line A in FIG. 2A. In some examples, buffer memory 220 may be implemented by a random access memory (RAM). In some examples, buffer memory 220 may be a resource that is shared amongst all the active egress port queues on egress port 210. Accordingly, in these examples, buffer memory 220 may temporarily hold data for all the active egress port queues on egress port 210.

Destination node 200 also comprises a monitor engine 230, a usage engine 240, and a rate engine 250. Each of these aspects of computing device 200 will be described below. It is appreciated that other engines can be added to computing device 200 for additional or alternative functionality.

Each of engines 230, 240, 250, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, destination node 200 may include additional engines.

Each engine of destination node 200 can include at least one machine-readable storage mediums (for example, more than one) and at least one computer processor (for example, more than one). For example, software that provides the functionality of engines on destination node 200 can be stored on a memory of a computer to be executed by a processor of the computer.

Monitor engine 230 is an engine of destination node 200 that includes a combination of hardware and software that allows destination node 200 to sample a transmit rate of egress port queue 211. It may do this by polling the egress port queue 211 at certain time intervals. Additionally, it may do this by receiving a signal from egress port queue 211 each time the transmit rate of egress port queue 211 is changed. Accordingly, monitor engine 230 may include hardware and software that allows it to communicate with egress port queue 211. This is represented by line B1 in FIG. 2A.

In some examples, monitor engine 230 may also allow destination node 200 to sample the amount of data that is in egress port queue 211. This is represented by line B2 in FIG. 2A. Accordingly, this allows destination node 200 to understand the "depth" of the egress port queue 211 and how much data is waiting to be transmitted from egress port queue 211. For example, the amount of data in egress port queue 211 may be 250 Bytes. This translates to 250 Bytes waiting to be transmitted from egress port queue 211.

In examples where egress port 210 has at least active two egress port queues, monitor engine 220 may sample the transmit rates of each individual egress port queue and the depths of each individual egress port queue. In some examples, egress port 210 may have a combination of active and inactive priorities. Monitor engine 220 may allow destination node 200 to determine which priorities are active and which priorities are inactive on egress port 210. For example, in response to a determination that an egress port queue on egress port 210 is transmitting at 0 Gbps, monitor engine 230 may determine that the specific priority associated to that egress port queue is not active. Accordingly, monitor engine 230 may determine that a utilization percentage and/or output rate does not have to be determined for the inactive priority.

Usage engine 240 is an engine of destination node 200 that includes a combination of hardware and software that allows destination node 200 to determine a utilization percentage of egress port queue 211. In some examples, the utilization percentage may be based on the sampled transmit rate of egress port queue 211 and the total rate capacity of egress port 210. For example, monitor engine 230 samples the transmit rate of egress port queue 211 to be 4 Gbps. Usage engine 240 may have knowledge that egress port 210, the port to which egress port queue 211 belongs to, has a total rate capacity of 25 Gbps. Accordingly, usage engine 240 determines that the utilization percentage of egress port queue 211 is 16% by taking 4 Gbps and dividing that by 25 Gbps. Accordingly, usage engine 240 may include hardware and software allowing it to communicate with monitor engine 230 to receive the sampled transmit rate for egress port queue 211 from monitor engine 230. This is represented by line C.

Usage engine 240 also allows destination node 200 to determine a backlog percentage of egress port queue 211. In some examples, the backlog percentage of egress port queue 211 may be based on the sampled depth of egress port queue 211, and an initially-set latency threshold of egress port queue 211. As discussed above, egress port queue 211 (and each egress port queue on egress port 210) may have an initially-set latency threshold. For example, an initially-set latency threshold for egress port queue 211 may be 2 microseconds, meaning that a data packet should spend at most 2 microseconds in egress port queue 211 waiting to be transmitted. Based on initially-set latency threshold, a latency threshold depth may be determined. Usage engine 240 may determine the backlog percentage of egress port queue 211 by comparing the latency threshold depth to the sampled depth of egress port queue 211. For example, in examples where the latency threshold depth should be 1 KB but the sampled depth of egress port queue 211 is 500 B, the backlog percentage of egress port queue 211 is 50% (500B/1000B). As discussed above in relation to instructions 113, the latency threshold depth may be influenced by the sampled transmit rate of egress port 211. For example, a slower transmit rate of egress port 211 may be associated with a lower latency threshold depth as compared to a higher transmit rate for the same latency threshold. Usage engine 240 accordingly allows destination node 200 to calculate the latency threshold depth based on the sampled transmit rate of egress port queue 211. Accordingly, usage engine 240 may perform the same functionalities as discussed in instructions 113 in relation to FIG. 1 in addition to the functionalities described in relation to FIG. 2A.

Rate engine 250 is an engine of destination node 200 that includes a combination of hardware and software that allows destination node 200 to determine an output rate for a virtual output queue on source node 260. The virtual output queue on source node 260 includes data that is specifically designated for egress port queue 211 on egress port 210. In some examples, the output rate may be based on the utilization percentage that is determined by usage engine 240. Additionally, in some examples, the output rate may be based on the utilization percentage and the backlog percentage determined by usage engine 240. Accordingly, rate engine 250 may include hardware and software allowing it to communicate with usage engine 240. This is represented by line D in FIG. 2A.

In some examples, the output rate may be first based on the utilization percentage. In other examples, the output rate may be first based on the utilization percentage and then adjusted by a modifier that is driven by the backlog percentage. For example, each backlog percentage may be associated with a specific modifier. This data may be stored in a storage medium of rate engine 250 in a lookup table. Upon receiving the backlog percentage, rate engine 250 may query the lookup table for the modifier that is associated with the backlog percentage. Accordingly, rate engine 250 may adjust the utilization percentage by the modifier. In some examples, the modifier may be a percent adjustment. The modifier may be a negative adjustment or a positive adjustment. For example, the utilization percentage may be determined to be 16%. The backlog percentage may be determined to be 65%. Using the lookup table, rate engine 250 may associate the backlog percentage of 65% to a modifier of −25%. Accordingly, the utilization percentage 16% is adjusted negatively by 4% (this is because 25% of 16% is 4). Thus, the output rate is determined by taking 16% and subtracting 4% from 16% to get 12%. As discussed above, the relationship between the backlog percentage and the modifier may vary according to characteristics that are specific to the network in which the destination node 200 is in. Some characteristics include the number of virtual output queues on the source node 260, the speed of the fabric nodes in the network, the network size, etc. Thus, while FIG. 2A illustrates the relationship as an exponential relationship, other relationships may be used, including linear relationships, etc.

As discussed above, buffer memory 220 may be a shared resource that is shared amongst the egress port queues on egress port 210. In some examples, egress port 210 may receive an increase in traffic and buffer memory 220 may not have enough available space to temporarily hold data for all the egress port queues. In these situations, usage engine 240 may also allow destination node 200 to modify an initially-set latency threshold of egress port queue 211. This allows the available space in buffer memory 220 to be allocated based on prioritization of traffic importance, instead of allocated on a first-come-first serve basis.

Based on the initially-set latency threshold of egress port queue 211, usage engine 240 may determine the latency threshold depth of egress port queue 211. This is the amount of space in buffer memory 220 that egress port queue 211 would like to have for itself in buffer memory 220 to achieve its initially-set latency threshold. The latency threshold depth is equal to the addition of the sampled depth that is currently in egress port queue 211 and an amount of additional space egress port queue 211 would desire. Usage engine 240 may compare the amount of additional space egress port queue 211 would desire to the amount of available space left in buffer memory 220. Responsive to a determination that the amount of available space left in buffer memory 220 is more than the amount of additional space egress port queue 211 would desire to have, usage engine 240 may leave the initially-set latency threshold unchanged. Responsive to a determination that the amount of available space left in buffer memory 220 is equal to or less than the amount of additional space egress port queue 211 would desire to have, usage engine 240 may place a limit on any additional space from buffer memory 220 that is allocated to egress port queue 211 to hold future incoming data packets.

In some examples, usage engine 240 may determine the additional space that may be given to egress port queue 211 using Eq. 1, as discussed above. Accordingly, usage engine 240 may include hardware and software that allows it communicate to buffer memory 220 and control allocation of buffer memory 220. This is represented by line E in FIG. 2A. The description above in relation to the biasing factor used with instructions 113 is also applicable here to usage engine 240. Usage engine 240 may determine a new latency threshold to replace the initially-set latency threshold based on the additional space that may be given to egress port queue 211, as discussed above in relation to instructions 113.

Destination node 200 of FIG. 2A, which is described in terms of engines containing hardware and software, may include at least one of the structural or functional aspects of computing device 100 of FIG. 1, which is described in terms of processors and machine-readable storage medium. Destination nod 200 may also include at least one structural or functional aspects of destination node 300A of FIG. 3. Additionally, while FIG. 2A shows certain lines representing communication between certain engines and buffers, these lines are for explanation purposes and not meant to be exhaustive.

Figure 2B:
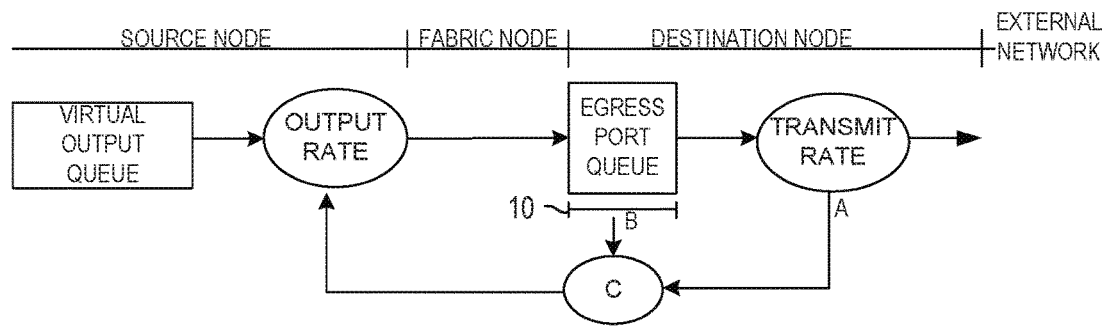
FIG. 2B is a flowchart of a control loop for an output rate of a virtual output queue, according to some examples.

FIG. 2B is a flowchart of the control loop for determining an output rate based on the transmit rate and egress port queue depth. As shown in FIG. 2B, data packets may flow from a virtual output queue on a source node into a fabric node, and from the fabric node into an egress port queue on destination node. The speed of data flow from the source node to the fabric node is determined by output rate. The speed of data flow from destination node into the external network is determined by the transmit rate. The control loop of the output rate is based upon the transmit rate and the egress port queue depth 10. The transmit rate is sampled at A, the egress port queue depth 10 is sampled at B. Both A and B are inputted into C to determine an output rate, as described above, which is then fed back to the source node's output rate as a control loop. Accordingly, the transmit rate and the egress port queue depth may dynamically control the output rate of the virtual output queue such that the data that is coming into the egress port queue does not overburden the egress port queue on the destination node.

FIG. 3 describes a network 3000 including a destination node 300A, a destination node 300B, a source node 360A, a source node 360B, a fabric node 370A, and a fabric node 370B. Source nodes 360A and 360B are communicatively connected to destination nodes 300A and 300B via fabric nodes 370A and 370B. Fabric nodes 370A and 370B may be computing devices. In some examples, fabric nodes 370A and 370B may be crossbar switches that allow connection of multiple inputs to multiple outputs in a matrix manner. Accordingly, in network 3000, data enters through either source node 360A or source node 360B, flows through the fabric nodes 370A and 370B, and leaves the network 3000 via either destination nodes 300A or 300B. While FIG. 3 illustrates network 3000 as having two source nodes, two fabric nodes, and two destination nodes, network 3000 is not limited to the number of source nodes, fabric nodes, and destination nodes shown.

Destination node 300A includes an egress port 310, a buffer memory 320, a monitor engine 330, a usage engine 340, a rate engine 350, and a message engine 351. The egress port 310 is similar to egress port 210 as described in relation to FIG. 2A except that egress port 310 has four active priorities and thus four egress port queues 311A-311D. Each egress port queue 311A, 311B, 311C, 311D may have its own transmit rate. The summation of the transmit rates may be equal to a total rate capacity of egress port 310.

Buffer memory 320 is similar to buffer memory 220 as described in relation to FIG. 2A, except that buffer memory 320 is shared amongst egress port queues 311A-311D. Accordingly, the space available in buffer memory 320 is allocated between the egress port queues 311A-311D. Monitor engine 330 is similar to monitor engine 230, usage engine 340 is similar to usage engine 240, and rate engine 350 is similar to rate engine 250, as described in relation to FIG. 2A.

Message engine 351 is an engine of destination node 300A that includes a combination of hardware and software that allows destination node to generate a message that includes the output rate determined by rate engine 350. In some examples, the message may include several fields, including a message identifier field, a source ID field, node Xmit mask field, and rate adjustment information field. The message identifier field identifies the message as an output rate message to source nodes 360A and/or 360B and fabric nodes 370A, 370B through which the message is to pass through before arriving at source nodes 360A and 360B. The source ID field may include a unique identifier of the destination node 300A from which message is generated. The node Xmit mask field may indicate the source nodes 360A and/or 360B to which the message should be sent. The rate adjustment information field may include the rate output. As discussed herein, the rate output is determined and communicated as a percentage. Using a percentage, in contrast to using a normalized rate, may help reduce the bandwidth that is consumed by the sending of the message to the source nodes as it reduces the information that needs to be transferred.

Message engine 351 may also allow destination node 300A to determine which fabric node to send the message to. Each egress port queue on destination node 300A has a corresponding virtual output queue on each source node. Thus, for example, egress port queue 311A has a corresponding virtual output queue 361A on source node 360A and a corresponding virtual output queue 361A on source node 360B. Accordingly, the message generated by message engine 351 comprising an output rate for virtual output queue 361A has to be received by both source node 360A and source node 360B. Depending on the load of the fabric nodes 370A and 370B, message engine 351 may determine to transmit the message to one fabric node, or to both fabric nodes. For example, if fabric node 370A is overburdened, message engine 351 may send the message to fabric node 370B. The message sent to fabric node 370B will indicate that the message should be replicated to both source node 360A and source node 360B. As another example, if both fabric nodes are overburdened, message engine 351 may send a first message to fabric node 370A with the output rate and a second message to fabric node 370B with the output rate. The first message may indicate that the message should be transmitted to source node 360A and the second message may indicate that the message should be transmitted to source node 360B. In this example, the overburdened fabric nodes do not need to replicate the message. Accordingly, message engine 351 may allow destination node 300A to allocate the burden of message replication amongst itself and the fabric nodes 370A, 370B.

Message engine 351 also allows destination node 300A to have a pathway for the message that is separate from the pathway of regular network traffic that come into destination node 300A. This is indicated by the dotted lines connecting message engine 351 of destination node 300A to fabric nodes 370A and 370B (as compared to the solid lines to indicate regular network traffic). Thus, while the message may share the same network inner connect between the destination node 300A and fabric nodes 370A and 370B, the internal pathway inside the destination node 300A is separate from regular network traffic. This may allow expedition of message transfer.

Destination node 300B is similar to destination node 300A and may include its own buffer memory, egress port, monitor engine, usage engine, rate engine, and message engine. Additionally, destination node 300B may include the same or a different number of egress port queues as destination node 300A.

Fabric node 370A is a computing devices that connects source nodes 360A and 360B to destination nodes 300A and 300B. Fabric node 370A includes a fabric message engine 371. Fabric message engine 371 may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, fabric node 370A may include additional engines.

Fabric message engine 371 can include at least one machine-readable storage mediums (for example, more than one) and at least one computer processor (for example, more than one). For example, software that provides the functionality of fabric engine 371 on fabric node 370A can be stored on a memory of a computer to be executed by a processor of the computer.

Fabric message engine 371 is an engine of fabric node 370A that includes a combination of hardware and software that allows fabric node 370A to transmit the message comprising the output rate to source nodes 360A and/or 360B. The message is received by fabric node 370A and then processed by fabric message engine 371. Accordingly, fabric message engine 371 provides a pathway that is separate from the regular network traffic pathway. The message identifier field in the message may indicate that it is a message comprising an output rate. Fabric message engine 371 may know that it is an output message rate due to the message identifier field.

Fabric message engine 371 may also allow fabric node 370A to replicate the message to send to multiple source nodes. This ability allows the replication to be handled by fabric node 370A and not destination node 300A, thus redistributing the load to the fabric node. The fabric message engine 371 may determine which source node to replicate the message to based on the node Xmit mask field that is in the message. For example, the Xmit mask field may indicate that the message should go to both source node 360A and source node 360B. Accordingly, fabric message engine 371 may replicate the message and transmit it to both source node 360A and 360B. Fabric message engine 371 may also include dedicated hardware (circuits, etc.) that is specifically for transmitting the message. Accordingly, the message does not travel through the standard network traffic paths. For example, in situations where fabric node 370A is a crossbar switch, the message does not travel through the crossbar but through a separate line. Accordingly, this separate pathway for the message allows for the message to be delivered quickly and for the message traffic to not influence standard network traffic flowing through fabric node 370A. This separate pathway is represented by dotted lines flowing from fabric message engine 371 to source node 360A and source node 360B (as compared to the solid lines connecting fabric node 370A to source nodes 360A and 360B). Fabric node 370B is similar to fabric node 370A and may include the engines as described above in relation to fabric node 370A.

Source node 360A may have a number of virtual output queue engines 361A-361D, a communication engine 362, and a message engine 363. Each of engines 361A-361D, 362, 363 and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, source node 360A may include additional engines.

Each engine of source node 360A can include at least one machine-readable storage mediums (for example, more than one) and at least one computer processor (for example, more than one). For example, software that provides the functionality of engines on source node 360A can be stored on a memory of a computer to be executed by a processor of the computer.

Virtual output queue engines 361A-361D are engines of source node 360A that include a combination of hardware and software that allows source node 360A to sort data that comes into source node 360A and place the data into different queues. Each virtual output queue engine is specifically linked to an egress port queue on a destination node in network 3000. Thus, for example, destination node 300A is shown has having four egress port queues 311A, 311B, 311C, and 311D. Accordingly, source node 360A has four virtual output queue engines 361A, 361B, 361C, and 361D. Virtual output queue engine 361A may order data that is meant for egress port queue 311A, virtual output queue engine 361B may order data that is meant for egress port queue 311B, virtual output queue engine 361C may order data that is meant for egress port queue 311C, and virtual output queue engine 361D may order data that is meant for egress port queue 311D. Accordingly, virtual output queue engine 361A may take the general data that comes into source node 360A, separate the data that is meant for egress port queue 311A and place that data in an order to be sent from source node 360A into fabric nodes 370A and 370B.

This allows for each egress port queue to have its own queue on the source node 360A. Source node 360A may have additional virtual output queue engines that are linked to additional egress port queues not shown in FIG. 3. For example, destination node 300B may have egress port queue (4), egress port queue (5) and source node 360A may have virtual output engines for those queues.

Virtual output queue engines 361A-361D also allow source node 360A to control the rate at which data from each queue is sent into the fabric nodes 370A and 370B. Each virtual output queue engine may have its own output rate. This is represented by circles A, B, C, and D. Thus, each virtual output queue engine may send data from their individual queues at different output rates to communication engine 362. Additionally, virtual output queue engines 361A-361D also allow source node 360A to change the output rate at which data from each queue is sent into the fabric nodes. Specifically, virtual output queue engines 361A-361D may receive a message from message engine 363, as described above, to change the output rates A, B, C, and/or D.

Communication engine 362 is an engine of source node 360A that includes a combination of hardware and software that allows source node 360A to communicate with fabric nodes 370A and 370B. For example, communication engine 362 may coordinate the sending of packets from the different virtual output queue engines 361A-361D and the creation of the data packets. Accordingly, the regular network traffic flows from the virtual output queue engines 361A-361D at their own rates A, B, C, and D to the communication engine 362 and into the fabric nodes 370A, 370B.

Message engine 363 is an engine of source node 360A that includes a combination of hardware and software that allows source node 360A to communicate messages from destination nodes 300A and 300B regarding the output rates A, B, C. and D to virtual output queue engines 361A-361D. Message engine 363 may communicate these messages to any virtual output queue engine 361A-361D that is affected by the message. For example, a message that includes an output rate for virtual output queue engine 361A, once received by source node 360A, may be communicated to virtual output queue engine 361A by message engine 363. Accordingly, message engine 363 provides a pathway for the message internally inside source node 36A that is separate from the pathway taken by data packets (i.e. regular network traffic) sent into the fabric nodes 370A and 370B. This is shown by the dotted lines connecting message engine 363 to virtual output queue engines 361A-361D as compared to the solid lines connecting the virtual output queue engines 361A-361D and communication engine 362. This separate pathway for the message in source node 360A may reduce the influence of message passing with that of standard network traffic. Additionally, this separate pathway may expedite the speed at which the message is received by the virtual output queue engine. Thus, while the message may share the same network inner connect between the source node 360A and fabric nodes 370A and 370B, the internal pathway inside the source node 360A is separate from standard network traffic.

Source node 360B is similar to source node 360A and may include the engines as described above in relation to source node 360A.

Network 3000, which is described in terms of engines containing hardware and software, may include at least one structural or functional aspects of computing device 100 of FIG. 1 or destination node 200 of FIG. A, which is described in terms of processors and machine-readable storage medium. Additionally, while FIG. 3 shows certain lines representing communication between certain components of network 3000, these lines are for explanation purposes and not meant to be exhaustive.

Figure 4:
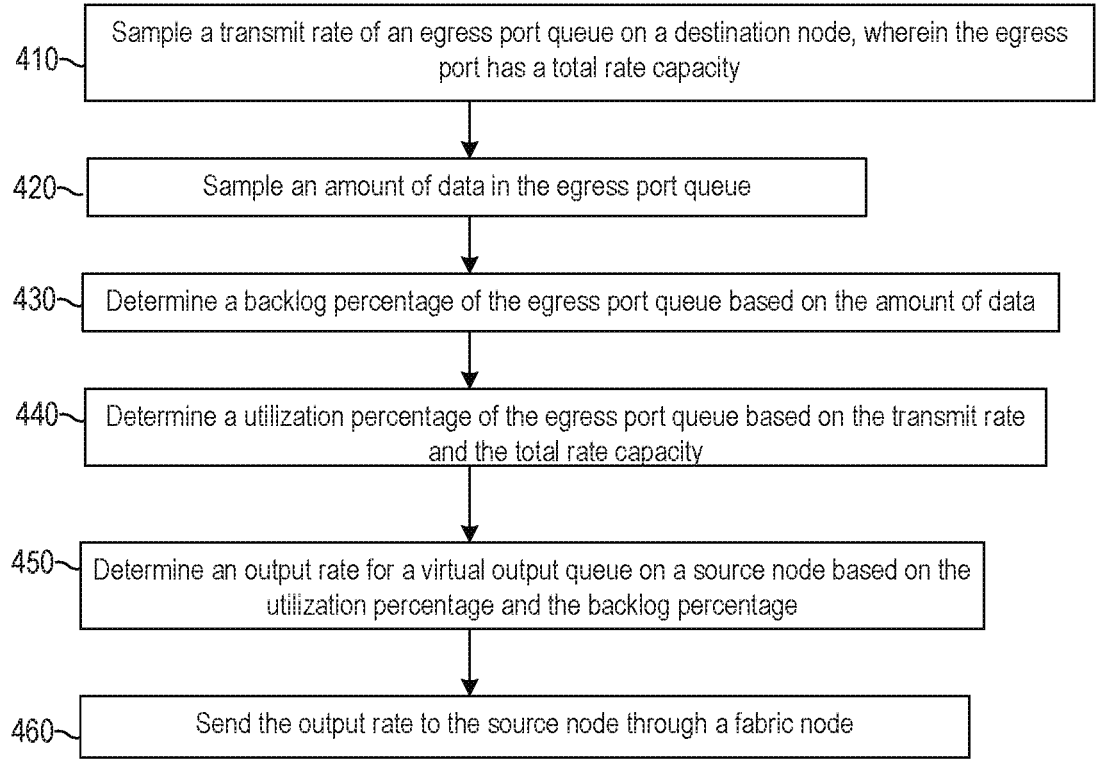
FIG. 4 is a flowchart of a method of determining an output rate for a virtual output queue, according to some examples.

FIG. 4 illustrates a flowchart for a method 400 to determine an output rate for a virtual output queue. Although execution of method 400 is described below with reference to destination node 200 of FIG. 2A, other suitable devices for execution of method 400 may be utilized (e.g., computing device 100 of FIG. 1A or destination node 300A of FIG. 3). Additionally, implementation of method 400 is not limited to such examples and it is appreciated that method 400 may be used for any suitable device or system described herein or otherwise.

At 410 of method 400, monitor engine 230 samples a transmit rate of egress port queue 211 of egress port 210 on destination node 200. The egress port 210 has a total rate capacity. At 420 of method 400, monitor engine 230 samples an amount of data in egress port queue 211. This amount of data may be temporarily stored in buffer memory 220. At 430 of method 400, usage engine 240 may determine a backlog percentage of egress port queue 211 based on the amount of data sampled at step 420. As discussed above, in some examples, the backlog percentage of egress port queue 211 may also be based on a latency threshold that was initially set for egress port queue 211. At 440 of method 400, usage engine 240 may determine a utilization percentage of egress port queue 211. The utilization percentage may be based on the transmit rate sampled at 410 and the total rate capacity of egress port 210. At 450 of method 400, rate engine 250 may determine an output rate for a virtual output queue on source node 260 based on the utilization percentage and the backlog percentage. The virtual output queue is for data that will be routed to egress port queue 211. At 460 of method 400, destination node 200 may send the output rate determined at 450 to the source node 260. In some examples, this may be done via a fabric node that is connected to both the source node 260 and the destination node 200.

Although the flowchart of FIG. 4 shows a specific order of performance of certain functionalities, method 400 is not limited to that order. For example, some of the functionalities shown in succession in the flowchart may be performed in a different order, may be executed concurrently or with partial concurrence, or a combination thereof. In some examples, 420 and 430 may be performed concurrently.

Figure 5:
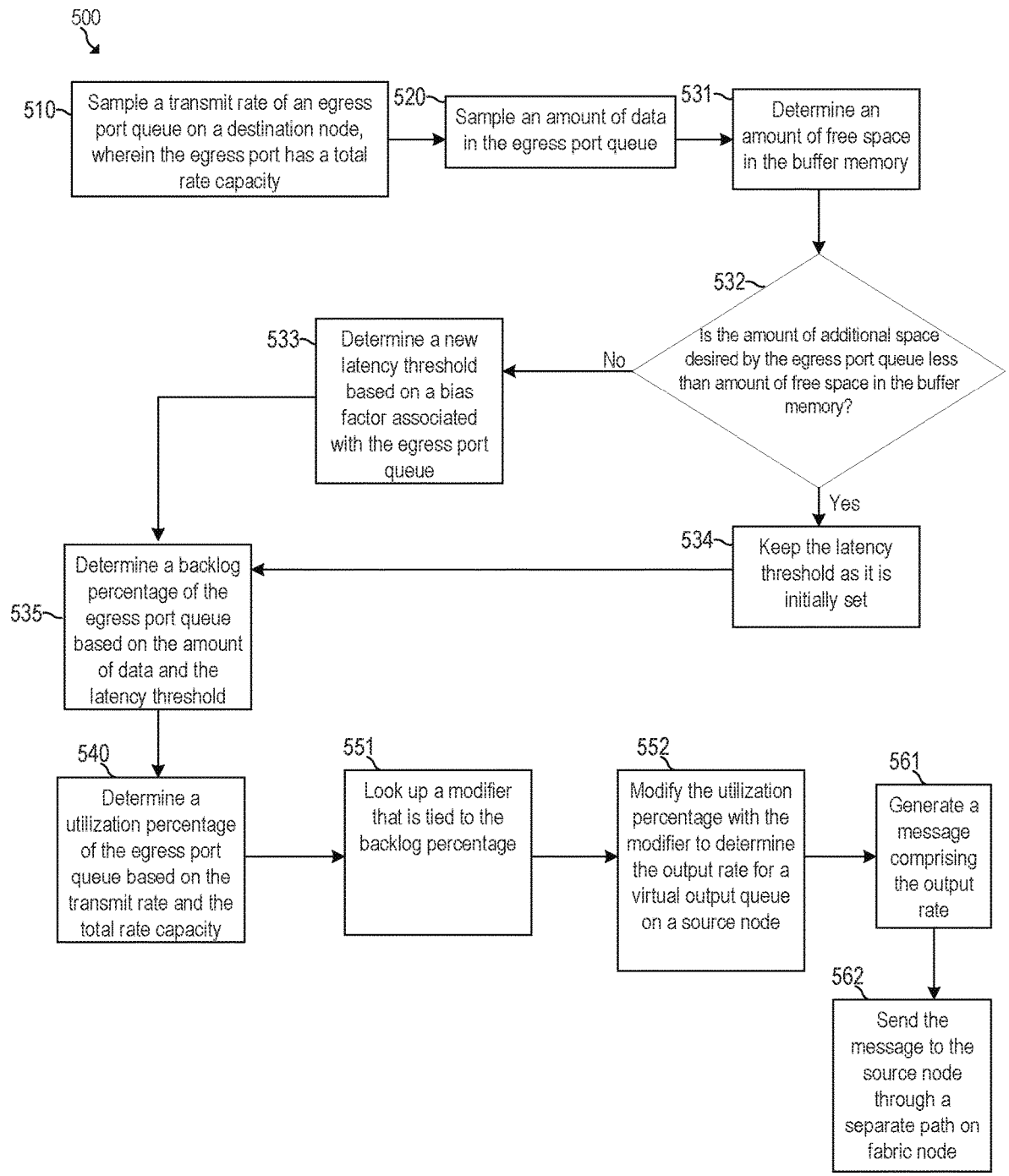
FIG. 5 is a flowchart of a method of determining a backlog percentage and a utilization percentage for an output rate, according to some examples.

FIG. 5 illustrates a flowchart for a method 500 to determine a backlog percentage and a utilization percentage for an output rate. Although execution of method 500 is described below with reference to destination node 300A of FIG. 3, other suitable devices for execution of method 500 may be utilized (e.g., computing device 100 of FIG. 1A or destination node 200 of FIG. 2A). Additionally, implementation of method 500 is not limited to such examples and it is appreciated that method 500 may be used for any suitable device or system described herein or otherwise.

At 510 of method 500, monitor engine 330 samples a transmit rate of egress port queue 311A on destination node 300A Egress port 310 has a total rate capacity. At 520, monitor engine samples an amount of data in egress port queue 311A. At 531 of method 500, usage engine 340 determines an amount of available space in buffer memory 320. Usage engine 340 may do this by polling buffer memory 320. At 532 of method 500, usage engine determines if amount of additional space desired by egress port queue 311A is less than the amount of available space in buffer memory 320. As discussed above in relation to instructions 113 and usage engine 240, the amount of additional space desired by egress port queue may be determined by an initially-set latency threshold assigned to egress port queue 311A and the sampled transmit rate of egress port queue 311A. From the initially-set latency threshold assigned to egress port queue 311A and the sampled transmit rate of egress port queue 311A, a latency threshold depth may be determined. The additional space desired by egress port queue 311A may be determined by subtracting the sampled amount of data in egress port queue 311A (at 520) from the latency threshold depth. Responsive to a determination that the amount of additional space desired by egress port queue 311A is less than the amount of available space in buffer memory 320, method 500 proceeds to 534. At 534, usage engine 340 keeps the latency threshold as it is initially set. Responsive to a determination that the amount of additional space desired by egress port queue 311A is equal to or more than the amount of available in buffer memory 320, method 500 proceeds to 533. At 533, usage engine 340 determines a new latency threshold. As discussed above in relation to instructions 113 and usage engine 240, a new latency threshold may be influenced by a bias factor that is associated with the egress port queue 311A and equation 1.

At 535 of method 500, usage engine 340 determines a backlog percentage of egress port queue 311A. This may be done based on the latency threshold (either initially set at 534 or newly determined at 533) and the amount of data sampled at 520. At 540, usage engine 340 determines a utilization percentage of egress port queue 311A based on the transmit rate sampled at 510 and the total rate capacity of egress port 310. At 551 of method 500, rate engine 350 looks up a modifier that is tied to the backlog percentage determined 535. As discussed above, the modifier may be a negative percent adjustment or a positive percent adjustment to the utilization percentage. At 552, rate engine 350 modifies the utilization percentage with the modifier to determine the output rate for virtual output queue 361A on source nodes 360A and 360B. At 561 of method 500, message engine 351 generates a message that comprises the output rate. At 562 of method 500, fabric message engine 371 on fabric node 370A sends the message through a path that is separate from standard network traffic pathway on fabric node 370A.

Although the flowchart of FIG. 5 shows a specific order of performance of certain functionalities, method 500 is not limited to that order. For example, some of the functionalities shown in succession in the flowchart may be performed in a different order, may be executed concurrently or with partial concurrence, or a combination thereof. In some examples, 520 and 530 may be performed concurrently. Additionally, while method 500 is described in relation to determining an output rate for virtual output queue (0) for egress port queue 311A, method 500 may also be performed for any and/or all virtual output queues on source node 360A and 360B.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that, when executed, cause a processing resource to:

sample a transmit rate of an egress port queue on a destination node, wherein the egress port has a total rate capacity;

determine a utilization percentage of the egress port queue based on the transmit rate and the total rate capacity;

determine a latency threshold for the egress port queue based on an amount of space desired by the egress port queue and an amount of memory available on the destination node;

determine a backlog percentage of the egress port queue based on the latency threshold;

determine an output rate for a virtual output queue on a source node based on the utilization percentage and the backlog percentage, wherein the virtual output queue is for the egress port queue; and produce a message for the source node, wherein the message indicates the output rate, which allows the source node to change an output rate for the virtual output queue on the source node based on the output rate.

2. The storage medium of claim 1, wherein the instructions to determine the backlog percentage of the queue comprise instructions, that, when executed, cause the processing resource to sample an amount of data in the egress port queue.

3. The storage medium of claim 1, wherein the latency threshold for the egress port queue is set by a user of the destination node and includes a time that a data packet spends in the egress port queue waiting to be transmitted.

4. The storage medium of claim 1, comprising instructions, that, when executed, compares the amount of space desired by the egress port queue with the amount of shared memory available on the destination node.

5. The storage medium of claim 1, comprising instructions, that, when executed, modifies the latency threshold based on a biasing factor when the amount of memory available on the destination node is less than the amount of space desired by the egress port queue.

6. The storage medium of claim 5, wherein the biasing factor is based on a quality of service of the egress port.

7. The storage medium of claim 1, comprising instructions, that, when executed, transmits a message comprising the output rate to the source node.

8. A network comprising:
a destination node comprising:
an egress port with an egress port queue, wherein the egress port has a total rate capacity;
a buffer memory to hold an amount of data for the egress port queue;
a monitor engine to sample a transmit rate of the egress port queue;
a usage engine to:
determine a utilization percentage of the egress port queue based on the transmit rate and the total rate capacity; and
determine a latency threshold for the egress port queue based on an amount of space desired by the egress port queue and an amount of memory available on the destination node;
a rate engine to determine an output rate for a virtual output queue associated with the egress port queue based on the utilization percentage and the latency threshold; and
a message engine to produce a message for a source node, wherein the message indicates the output rate, which allows the source node to change an output rate for the virtual output queue on the source node based on the output rate.

9. The network of claim 8,
wherein the usage engine is further to determine a backlog percentage of the egress port queue; and
wherein the output rate is further based on the backlog percentage.

10. The network of claim 9,
wherein the monitor engine is to monitor the amount of data in the egress port queue; and
wherein the usage engine is to determine the backlog percentage based on the amount of data.

11. The network of claim 8, wherein the message engine is further to transmit the message to the source node.

12. The network of claim 8, further comprising the source node, wherein the source node comprises a virtual output queue engine which is to generate the virtual output queue.

13. The network of claim 8, comprising a fabric node to connect the source node with the destination node, wherein the fabric node comprises a fabric message engine to transmit the message through the fabric node.

14. The network of claim 13, wherein a pathway of the message through the fabric node is separate from a pathway of data packets through the fabric node.

15. The network of claim 13, wherein the fabric message engine is further to replicate the message.

16. A method comprising:
sampling a transmit rate of an egress port queue on a destination node, wherein the egress port has a total rate capacity;
sampling an amount of data in the egress port queue;
sampling a transmit rate of the egress port queue, wherein the egress port has a total rte capacity;
determining a utilization percentage of the egress port queue based on the transmit rate and the total rate capacity;
determining a latency threshold for the egress port queue based on an amount of space desired by the egress port queue and an amount of memory available on the destination node;
determining a backlog percentage of the egress port queue based on the latency threshold and the amount of data;
determining an output rate for a virtual output queue on a source node based on the utilization percentage and the backlog percentage; and
sending the output rate to the source node through a fabric node, which causes the source node to change an output rate for the virtual output queue on the source node based on the output rate.

17. The method of claim 16, wherein the latency threshold for the egress port queue is set by a user of the destination node and includes a time that a data packet spends in the egress port queue waiting to be transmitted.

18. The method of claim 16, wherein the latency threshold is based on a biasing factor for the egress port queue.

19. The method of claim 16, wherein the sending of the output rate through the fabric node is via a dedicated message pathway.

20. The method of claim 19, wherein the dedicated message pathway is different from a pathway of a data packet through the fabric node.

* * * * *